US010132231B2

(12) United States Patent
Iwamoto

(10) Patent No.: US 10,132,231 B2
(45) Date of Patent: Nov. 20, 2018

(54) CONTROL APPARATUS FOR INTERNAL COMBUSTION ENGINE

(71) Applicant: TOYOTA JIDOSHA KABUSHIKI KAISHA, Toyota-shi, Aichi-ken (JP)

(72) Inventor: Masahiro Iwamoto, Nisshin (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 149 days.

(21) Appl. No.: 15/198,213

(22) Filed: Jun. 30, 2016

(65) Prior Publication Data
US 2017/0002726 A1 Jan. 5, 2017

(30) Foreign Application Priority Data

Jul. 1, 2015 (JP) ................................ 2015-132721

(51) Int. Cl.
F02B 33/44 (2006.01)
F02B 33/00 (2006.01)
F02B 37/04 (2006.01)
F02B 37/10 (2006.01)
F02B 39/10 (2006.01)
F02D 41/00 (2006.01)
F02B 37/12 (2006.01)
(Continued)

(52) U.S. Cl.
CPC .............. F02B 37/04 (2013.01); F01D 15/10 (2013.01); F02B 37/10 (2013.01); F02B 37/127 (2013.01); F02B 39/10 (2013.01); F02D 41/0002 (2013.01); F02D 41/0007 (2013.01); H02K 7/1823 (2013.01); F02B 2037/162 (2013.01); Y02T 10/144 (2013.01); Y02T 10/42 (2013.01)

(58) Field of Classification Search
CPC .......... F02B 37/04; F02B 37/10; F02B 39/10; F02B 37/013; F02B 2037/162; F01D 15/10; F02D 41/0002; F02D 41/0007; H02K 7/1823; Y02T 10/144; Y02T 10/42
USPC .......... 60/608, 607, 609, 611, 612; 123/562
See application file for complete search history.

(56) References Cited

U.S. PATENT DOCUMENTS 6,722,129 B2 * 4/2004 Criddle ................... F02B 39/10
60/612
6,883,324 B2 * 4/2005 Igarashi .................. F02B 39/10
60/608

(Continued)

FOREIGN PATENT DOCUMENTS

DE 10159801 A1 * 4/2003 .............. F02B 37/04
EP 2995798 A1 * 3/2016 .............. F02B 37/04
(Continued)

Primary Examiner — Thai Ba Trieu
(74) Attorney, Agent, or Firm — Hunton Andrews Kurth LLP

(57) ABSTRACT

A control apparatus for an internal combustion engine is configured, when regenerative processing by an electric supercharger is executed, to control the opening degree of a throttle valve, the opening degree of an intake bypass valve and the power generation load on a motor generator to set the opening degree of the intake bypass valve and the power regeneration load so that a second intake pressure which is an intake pressure downstream of an electric compressor and upstream of a turbo compressor does not fall below a second specific pressure value, based on a request intake air flow rate of the internal combustion engine and the second intake pressure.

5 Claims, 8 Drawing Sheets

(51) Int. Cl.
　　　*F01D 15/10*　　　(2006.01)
　　　*H02K 7/18*　　　(2006.01)
　　　*F02B 37/16*　　　(2006.01)

(56) References Cited

U.S. PATENT DOCUMENTS

| | | | | |
|---|---|---|---|---|
| 6,907,867 | B2 * | 6/2005 | Igarashi | F02B 39/10 |
| | | | | 60/608 |
| 6,922,996 | B2 * | 8/2005 | Ellmer | F02B 39/10 |
| | | | | 60/608 |
| 6,957,535 | B2 * | 10/2005 | Sumser | F02B 39/10 |
| | | | | 60/608 |
| 7,451,597 | B2 * | 11/2008 | Kojima | F02B 39/10 |
| | | | | 60/611 |
| 7,530,229 | B2 * | 5/2009 | Akita | F02B 39/10 |
| | | | | 60/608 |
| 2014/0208745 | A1 * | 7/2014 | Suhocki | F02B 37/04 |
| | | | | 60/611 |
| 2016/0061104 | A1 * | 3/2016 | Hirayama | F02B 39/10 |
| | | | | 60/602 |
| 2016/0076438 | A1 * | 3/2016 | Tabata | F02B 37/04 |
| | | | | 60/602 |
| 2016/0281652 | A1 * | 9/2016 | Takasu | F02B 39/10 |
| 2016/0348578 | A1 * | 12/2016 | Oyagi | F02B 39/10 |
| 2017/0030257 | A1 * | 2/2017 | Wu | F02B 39/10 |
| 2017/0145905 | A1 * | 5/2017 | Yamane | F02B 39/10 |
| 2017/0145906 | A1 * | 5/2017 | Tomita | F02B 37/10 |
| 2017/0152800 | A1 * | 6/2017 | Han | F02B 39/10 |

FOREIGN PATENT DOCUMENTS

| | | | | |
|---|---|---|---|---|
| GB | 2504953 A | * | 2/2014 | F02B 39/10 |
| JP | 57212331 A | * | 12/1982 | F02B 39/10 |
| JP | H11-324688 A | | 11/1999 | |
| JP | 2006-105075 A | | 4/2006 | |
| JP | 2012-067614 A | | 4/2012 | |
| JP | 2017136974 A | * | 8/2017 | |
| WO | WO 2015093204 A1 | * | 6/2015 | F02B 39/10 |
| WO | WO 2016002964 A1 | * | 1/2016 | F02D 41/0007 |

* cited by examiner

CONTROL APPARATUS FOR INTERNAL COMBUSTION ENGINE

CROSS-REFERENCE TO RELATED APPLICATION

The present application claims priority to Japanese Patent Application No. 2015-132721 filed on Jul. 1, 2015, which is incorporated herein by reference in its entirety.

BACKGROUND

Technical Field

Preferred embodiments relate to a control apparatus for an internal combustion engine, and more particularly to a control apparatus for controlling an internal combustion engine equipped with an electric compressor upstream of a turbo compressor of a turbocharger.

Background Art

Japanese Patent Laid-Open No. 2006-105075 discloses a control apparatus for an internal combustion engine equipped with an electric supercharger in an intake passage. The control apparatus performs energy regeneration that converts kinetic energy of intake air into electric energy by using the electric supercharger, when the operation range of the internal combustion engine is an intermediate load range. The energy regeneration is performed by controlling the generated power by the regeneration so that the intake air flow rate becomes a target intake air flow rate while fully opening the throttle valve.

Technical Problem

There is known an internal combustion engine which is equipped with a turbo compressor of a turbocharger in an intake passage at the downstream side of an electric compressor of an electric supercharger. When regeneration is performed by using the electric supercharger, the electric compressor functions as a restrictor in the intake passage. Consequently, when such regeneration is performed, an intake pressure at the downstream side of the electric compressor and the upstream side of the turbo compressor becomes a negative pressure. When the intake pressure becomes a negative pressure to a large extent at the time of regeneration, the intake pressure at an outlet of the turbo compressor also reduces. As a result, there is a possibility of oil leaking from an oil seal portion located at a rear surface side of the turbo compressor.

SUMMARY

Preferred embodiments address the above-described problem and have an object to provide a control apparatus for an internal combustion engine which is enabled to perform regeneration using an electric supercharger while controlling oil leakage from a turbocharger in an internal combustion engine equipped with a turbo compressor downstream of an electric compressor of the electric supercharger.

A control apparatus for an internal combustion engine according to preferred embodiments controls an internal combustion engine which includes: an intake passage through which intake air taken into a cylinder flows; an exhaust passage through which exhaust gas from the cylinder flows; an intake air flow rate regulation device provided in the intake passage and configured to regulate an intake air flow rate of air that is taken into the cylinder; a turbocharger including a turbine arranged in the exhaust passage, a turbo compressor arranged in the intake passage, a connection shaft that connects the turbine and the turbo compressor, and an oil seal portion that is provided on the connection shaft at a location on a rear surface side of an impeller of the turbo compressor; an electric supercharger including an electric compressor arranged in the intake passage on an upstream side of the turbo compressor, and a motor generator that is a drive source of the electric compressor and configured to function as a generator when regeneration is performed; an intake bypass passage connecting the intake passage on an upstream side of the electric compressor, with the intake passage which is at a downstream side of the electric compressor and at an upstream side of the turbo compressor; and an intake bypass valve configured to open and close the intake bypass passage. The control apparatus includes a regenerative processing section that is configured to execute regenerative processing with the electric supercharger, by controlling an intake air flow rate, an opening degree of the intake bypass valve and a power generation load on the motor generator. The regenerative processing section is configured, at a time of execution of the regenerative processing, to set at least one of the opening degree of the intake bypass valve and the power generation load on the motor generator, based on a request intake air flow rate of the internal combustion engine, a rotational speed of the turbocharger, and a first specific pressure value which is a pressure value of a first intake pressure that is an intake pressure at an outlet of the turbo compressor and which satisfies a condition where oil leakage to a side of the turbo compressor from the oil seal portion does not occur.

The internal combustion engine may further includes a second intake pressure acquiring device configured to acquire a second intake pressure that is an intake pressure downstream of the electric compressor and upstream of the turbo compressor. The regenerative processing section may be configured to: calculate a second specific pressure value which is a pressure value of the second intake pressure and which satisfies a condition where the oil leakage does not occur, based on the first specific pressure value, the intake air flow rate of the internal combustion engine, and the rotational speed of the turbocharger; and set at least one of the opening degree of the intake bypass valve and the power generation load on the motor generator, based on the request intake air flow rate and the second intake pressure so that the second intake pressure does not fall below the calculated second specific pressure value.

The regenerative processing section may be configured, when the request intake air flow rate is larger than a first intake air flow rate at a time of the second intake pressure having the second specific pressure value in a state where the power generation load is set at a maximum value within a predetermined control range and where the intake bypass valve is fully closed, to make the opening degree of the intake bypass valve larger, or make the power generation load lower, as compared with when the request intake air flow rate is smaller than the first intake air flow rate.

The regenerative processing section may be configured, when the request intake air flow rate is larger than the first intake air flow rate, to make the opening degree of the intake bypass valve larger as the request intake air flow rate is larger.

The regenerative processing section may be configured, when the request intake air flow rate is larger than a second intake air flow rate at a time of the second intake pressure having the second specific pressure value in a state where the power generation load is set at the maximum value within the control range and where the intake bypass valve is fully opened, to make the power generation load lower as the request intake air flow rate is larger.

According to the control apparatus of preferred embodiments, at the time of execution of the regenerative processing by the electric supercharger, at least one of the opening degree of the intake bypass valve and the power generation load on the motor generator is set based on the request intake air flow rate of the internal combustion engine, the rotational speed of the turbocharger, and the first specific pressure value which is the pressure value of the first intake pressure that is the intake pressure at the outlet of the turbo compressor and which satisfies the condition that oil leakage to a side of the turbo compressor from the oil seal portion does not occur. Thus, according to the control apparatus of preferred embodiments, at least one of the opening degree of the intake bypass valve and the power generation load on the motor generator is set with the above described first specific pressure value taken into consideration, and therefore, when regeneration using the electric supercharger is performed in the internal combustion engine equipped with the turbo compressor downstream of the electric compressor, oil leakage from the turbocharger can be controlled.

DETAILED DESCRIPTION

First Embodiment

Configuration of System of First Embodiment

Figure 1:
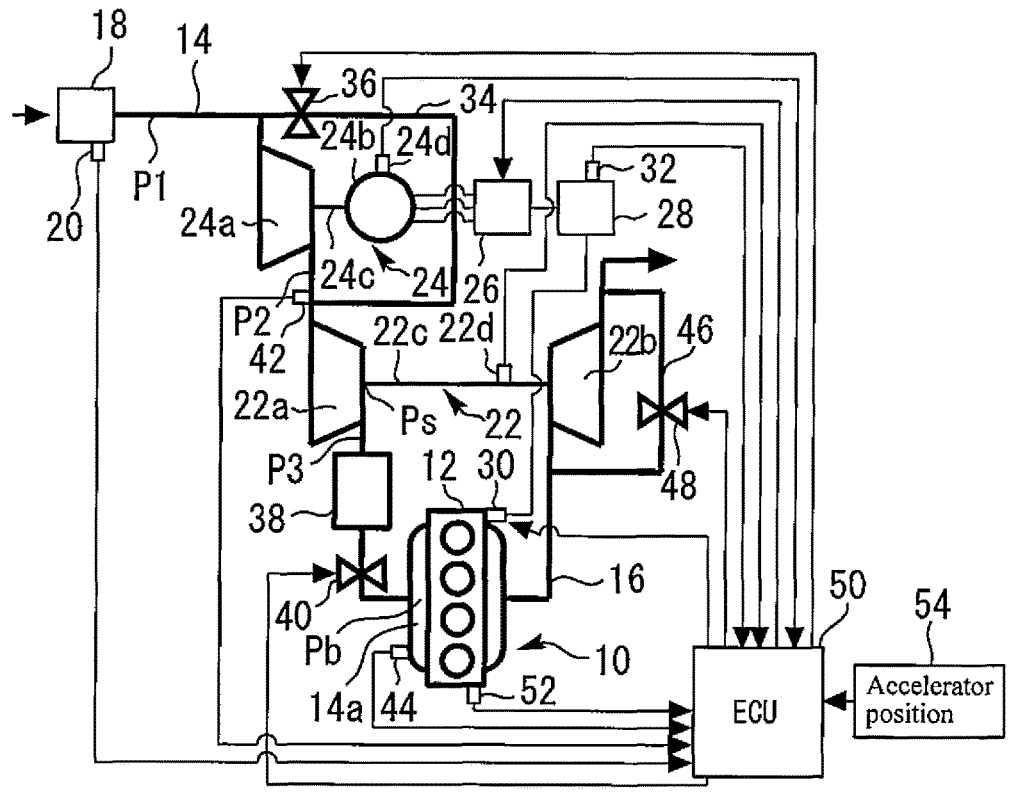
FIG. 1 is a diagram for explaining a configuration of a system of a first embodiment of the present application.

FIG. 1 is a diagram for explaining a configuration of a system of a first embodiment of the present application. An internal combustion engine 10 shown in FIG. 1 is equipped with an internal combustion engine main body 12. The internal combustion engine 10 is a spark ignition type engine (a gasoline engine, as an example), and is mounted in a vehicle and is used as a power source of the vehicle. An intake passage 14 and an exhaust passage 16 communicate with each cylinder in the internal combustion engine main body 12.

An air cleaner 18 is provided in the vicinity of an inlet of the intake passage 14. The air cleaner 18 is provided with an air flow sensor 20 that outputs a signal corresponding to the flow rate of air flowing through the intake passage 14. A compressor 22a (hereinafter, referred to as a "turbo compressor 22a") of a turbocharger 22 is arranged in the intake passage 14 at the downstream side of the air cleaner 18 to supercharge intake air. The turbocharger 22 is equipped with a turbine 22b which is operated by exhaust energy of exhaust gas and arranged in the exhaust passage 16. The turbo compressor 22a is integrally connected to the turbine 22b via a connection shaft 22c, and is rotationally driven by exhaust energy which is inputted to the turbine 22b. Further, the turbocharger 22 is equipped with a turbo rotational speed sensor 22d for detecting a rotational speed (hereinafter, also referred to as a "turbo rotational speed") Nt of the turbo compressor 22a.

In the intake passage 14 at the upstream side of the turbo compressor 22a, a compressor 24a (hereinafter, also referred to as an "electric compressor 24a") of an electric supercharger 24 is arranged. The electric compressor 24a uses a motor generator (MG) 24b as a drive source. The MG 24b has both a function as an electric motor and a function as a generator, and exchanges electric power with a battery 28 via an inverter 26. As an example, the MG 24b is a permanent magnet synchronous type motor generator using a three-phase alternating current (AC) (more specifically, a motor generator equipped with a rotor having a permanent magnet and a stator on which a three-phase coil that forms a rotating magnetic field is wound). The permanent magnet functions as a field magnet, and the stator functions as an armature. However, a configuration of the motor generator intended for the present application is not specially limited to the above described configuration.

More specifically, when the MG 24b is caused to function as the electric motor, the inverter 26 converts a direct current (DC) from the battery (a DC power supply) 28 into a three-phase AC and supplies the three-phase AC to the MG 24b. In this case, the electric compressor 24a is rotationally driven by a drive force generated by the MG 24b. Electric power stored in the battery 28 is basically generated by an alternator 30 by using the power of the internal combustion engine 10.

Further, the inverter 26 causes the MG 24b to function as a generator by applying a power generation load to the MG 24b which is rotating, and can perform energy regeneration that converts kinetic energy of intake air into electric energy by using the electric supercharger 24. Application of the power generation load to the MG 24b is equivalent to application of a braking force to the rotation of the electric compressor 24a which is brought about by a flow of intake air. When the power generation load is increased, the braking force (regenerative braking force) to the rotation of the electric compressor 24a increases, and the generated power increases. Regulation of the magnitude of the power generation load by the inverter 26 can be performed by regulating the current of the armature of the MG 24b. More specifically, as the current of the armature is made larger, the power generation load can be made larger, and as a result, the generated power by regeneration (also simply referred to as "regenerative electric power") can be made large. If the motor generator is configured so that the field magnetic current can be regulated, for example, unlike the configuration of the aforementioned MG 24b, the power generation load can be regulated by regulating the field magnetic current.

The electric power which is stored in the battery 28 also includes the above described regenerated power. The MG 24b is equipped with an electric compressor rotational speed sensor 24d for detecting a rotational speed (namely, an electric compressor rotational speed) Nec of a rotary shaft 24c of the MG 24b. Further, the system of the present embodiment is equipped with an SOC sensor 32 for detecting a state of charge (SOC: State Of Charge) of the battery 28.

An intake bypass passage 34 that bypasses the electric compressor 24a is connected to the intake passage 14. More specifically, the intake bypass passage 34 is configured to connect the intake passage 14 at the upstream side of the electric compressor 24a with the intake passage 14 which is at the downstream side of the electric compressor 24a and at the upstream side of the turbo compressor 22a. An intake bypass valve 36 that opens and closes the intake bypass passage 34 is arranged in the intake bypass passage 34.

More specifically, the opening degree of the intake bypass valve 36 is controlled within a predetermined opening degree control range from a minimum opening degree to a maximum opening degree. In the present embodiment, the minimum opening degree is the fully closed opening degree (0%), and the maximum opening degree is the full opening degree (100%), as an example. According to the intake bypass valve 36 of the configuration of the present embodiment, when the intake bypass valve 36 is fully closed, a whole amount of the intake air goes to the electric compressor 24a through the intake passage 14 without passing through the intake bypass passage 34. Meanwhile, as the opening degree of the intake bypass valve 36 becomes larger, the flow rate of intake air that bypasses the electric compressor 24a by passing through the intake bypass passage 34 becomes larger. When the intake bypass valve 36 is fully opened, the intake bypass passage 34 with the maximum opening degree is ensured as well as the intake passage 14 that extends toward the electric compressor 24a.

An intercooler 38 for cooling intake air compressed by the turbo compressor 22a, or both of the turbo compressor 22a and the electric compressor 24a is arranged in the intake passage 14 at the downstream side of the turbo compressor 22a. An electronically controlled throttle valve 40 that controls the intake air flow rate Ga by opening and closing the intake passage 14 is arranged in the intake passage 14 at the downstream side of the intercooler 38. The intake passage 14 at the downstream side of the throttle valve 40 is configured by an intake manifold 14a, and intake air is distributed to the respective cylinders via the intake manifold 14a.

An intake pressure sensor 42 for detecting an intake pressure P2 described later is attached to the intake passage 14 at the downstream side of the electric compressor 24a. An intake pressure sensor 44 that detects an intake pressure (more specifically, an intake manifold pressure) Pb is attached to the intake manifold 14a.

The exhaust passage 16 is equipped with an exhaust bypass passage 46 that bypasses the turbine 22b. An electronically controlled waste gate valve (WGV) 48 is arranged in the exhaust bypass passage 46, as an exhaust bypass valve that opens and closes the exhaust bypass passage 46. By regulating the flow rate of exhaust gas that passes through the turbine 22b by changing the opening degree of the WGV 48, the amount of exhaust energy collected by the turbine 22b can be regulated, and as a result, the drive force of the turbo compressor 22a can be regulated.

Further, as a control apparatus that controls the internal combustion engine 10, the system of the present embodiment includes an electronic control unit (ECU) 50, drive circuits (not illustrated except for the inverter 26) for driving the following various actuators and the like. The ECU 50 is equipped with at least an input/output interface, a memory and a central processing unit (CPU), and performs control of the entire system shown in FIG. 1. The input/output interface is configured to receive sensor signals from various sensors attached to the internal combustion engine 10 or the vehicle in which the internal combustion engine 10 is mounted, and output operation signals to the various actuators with which the internal combustion engine 10 is equipped. In the memory, various control programs, maps and the like for controlling the internal combustion engine 10 are stored. The CPU reads a control program or the like from the memory and executes the control program or the like, and generates operation signals for the various actuators on the basis of the sensor signals.

The sensors, the signals of which the ECU 50 takes in, include various sensors for acquiring an engine operation state such as a crank angle sensor 52 for acquiring a rotation position of a crankshaft and an engine speed Ne, in addition to the air flow sensor 20, the turbo rotational speed sensor 22d, the electric compressor rotational speed sensor 24d, the SOC sensor 32 and the intake pressure sensors 42 and 44 which are described above. The above described sensors also include an accelerator position sensor 54 for detecting a depressing amount of an accelerator pedal (an accelerator position) of the vehicle in which the internal combustion engine 10 is mounted.

The actuators to which the ECU 50 outputs operation signals include various actuators (not illustrated) for controlling an operation of the engine such as fuel injection valves for supplying fuel to the respective cylinders, and an ignition device for igniting mixture gas in the respective cylinders, in addition to the MG 24b, the intake bypass valve 36, the throttle valve 40 and the WGV 48 which are described above.

Figure 2:
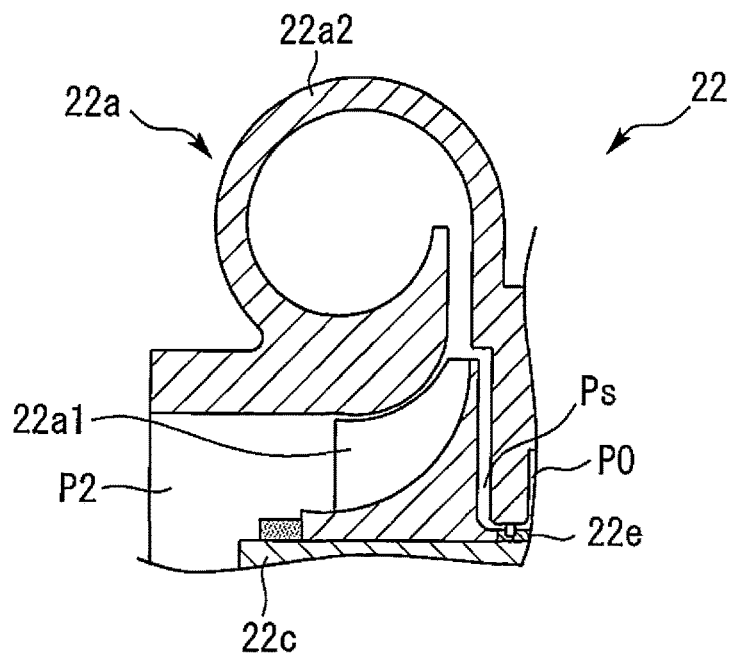
FIG. 2 is a view for explaining an oil seal structure of a turbocharger, and shows a configuration of the periphery of a turbo compressor.

FIG. 2 is a view for explaining an oil seal structure of the turbocharger 22, and shows a configuration of the periphery of the turbo compressor 22a. As shown in FIG. 2, an oil seal portion 22e is provided on the connection shaft 22c at the rear surface side of an impeller 22a1 of the turbo compressor 22a. Inside the turbocharger 22, a bearing (not illustrated) of the connection shaft 22c is provided. The oil seal portion 22e is provided to prevent oil supplied to the bearing from flowing out to the side of a housing 22a2 of the turbo compressor 22a.

Here, with reference to FIGS. 1 and 2, pressures at the respective parts (including an internal intake passage of the turbo compressor 22a) of the intake passage 14 will be referred to as follows. An intake pressure P1 is an inlet pressure of the electric compressor 24a (a downstream pressure of the air cleaner 18). The intake pressure P2 is an intake pressure downstream of the electric compressor 24a and upstream of the turbo compressor 22a. That is, the intake pressure P2 is equivalent to an outlet pressure of the electric compressor 24a and an inlet pressure of the turbo compressor 22a. An intake pressure P3 is an outlet pressure of the turbo compressor 22a (more specifically, an intake pressure at a place of an exit from the housing 22a2). The intake pressure Pb is the intake manifold pressure as described above. Further, as shown in FIG. 2, an intake pressure Ps is an intake pressure in the vicinity of a back surface of the turbo compressor 22a and in the vicinity of the connection shaft 22c, and is basically equal to the intake pressure P3. However, the intake pressure Ps sometimes becomes lower than the intake pressure P3 as described later. P0 is a turbo internal pressure (more specifically, a pressure at an inner site of the turbocharger 22 with respect to the oil seal portion 22e), and is substantially the atmospheric pressure.

[Basic Control of Engine Torque]

In engine torque control of the internal combustion engine 10, a request torque is calculated in accordance with the accelerator depression amount, and an engine torque is controlled so that the calculated request torque is obtained. Specifically, when the request torque is calculated, the intake air flow rate Ga required to realize the request torque is calculated as a request intake air flow rate GaR.

In the case of the internal combustion engine 10, the intake air flow rate Ga can be regulated by using the throttle valve 40 or the WGV 48. In the present embodiment, as an example of control of the WGV 48, so-called normal open control is carried out in order to, for example, enhance fuel efficiency by reducing pumping loss. Specifically, in a low-load side operation range in an engine operation range that is defined by the engine torque and the engine speed Ne, the intake air flow rate Ga is regulated so that the request intake air flow rate GaR is obtained by regulation of the opening degree of the throttle valve 40 in a state where the opening degree of the WGV 48 is opened to a maximum opening degree in a predetermined opening degree control range (hereinafter, also referred to as a "full opening degree").

Meanwhile, in an operation range where the intake air flow rate Ga is required, which is larger than a flow rate at the time of the throttle valve 40 reaching the full opening degree in the state where the WGV 48 is opened to the full opening degree, the throttle valve 40 is kept at the full opening degree. Further, in this operation range, the opening degree of the WGV 48 is regulated so that, in a state where the throttle valve 40 is kept at the full opening degree, a request intake pressure (a request intake manifold pressure) PbR that is required to realize the request intake air flow rate GaR is obtained. Thereby, the intake air flow rate Ga in this operation range is regulated to be the request intake air flow rate GaR. The request intake manifold pressure PbR can be calculated on the basis of the request intake air flow rate GaR and the engine speed Ne.

Further, the internal combustion engine 10 of the present embodiment is equipped with the electric compressor 24a as described above. Consequently, by operating the electric compressor 24a in accordance when needed, the intake air flow rate Ga can be regulated and can assist supercharging that is performed by the turbo compressor 22a. When the electric compressor 24a is operated to perform supercharging, the intake bypass valve 36 is closed.

[Control of First Embodiment]
(Problem Concerning Energy Regeneration Using Electric Compressor)

When the electric compressor 24a receives a flow of intake air in a state where an operation for supercharging is not performed, the electric compressor 24a rotates by receiving a drive force from the intake air. Consequently, when the throttle valve 40 is opened while the intake bypass valve 36 is closed in a state where the electric compressor 24a is not operated by the MG 24b for supercharging, the intake air flow rate Ga increases, and, as a result, the rotational speed Nec of the electric compressor 24a (MG 24b) increases due to an increase in the drive force by the intake air.

Meanwhile, when regeneration of energy is performed by applying a power generation load to the MG 24b which is rotationally driven by the flow of the intake air as described above, the electric compressor 24a functions as a restrictor in the intake passage 14 as a result of the rotation of the electric compressor 24a being restricted. As a result, the electric compressor 24a causes a pressure loss of the intake air. This becomes a factor of decreasing the intake air flow rate Ga. Accordingly, by applying a power generation load to the MG 24b so that the intake air flow rate Ga decreases by a flow rate corresponding to an increase amount of the intake air flow rate Ga caused by opening the throttle valve 40, regeneration can be performed while a change in the intake air flow rate Ga (namely, change in the engine torque) is suppressed. As described above, the electric power of the battery 28 which is supplied to the electric compressor 24a is basically generated by the alternator 30 by using the power of the internal combustion engine 10. Consequently, if the electric power which is obtained by regeneration using the electric supercharger 24 is stored in the battery 28, power generation by the alternator 30 can be reduced. This leads to enhancement of fuel efficiency of the internal combustion engine 10.

Here, in order to increase the regenerative electric power to a maximum, it is desirable to fully open the throttle valve 40 to increase the flow rate of intake air which is supplied to the electric compressor 24a to the maximum. However, in the case of performing regeneration in the configuration equipped with the turbo compressor 22a downstream of the electric compressor 24a as in the internal combustion engine 10 of the present embodiment, there arises the problem as follows if the throttle valve 40 is always fully opened without special consideration (that is, if the throttle valve 40 is opened as much as possible). That is, since the power generation load on the MG 24b is increased in response to the operation of the throttle valve 40, the intake pressure P2 which is the intake pressure downstream of the electric compressor 24a and upstream of the turbo compressor 22a becomes a negative pressure to a large extent. If the intake pressure P2 becomes a negative pressure to a large extent, the intake pressure P3 is also reduced. As a result, the intake pressure Ps which is the intake pressure in the vicinity of the connection shaft 22c of the turbocharger 22 becomes lower than the turbo internal pressure P0 which is substantially the atmospheric pressure, and oil may leak from the oil seal portion 22e.

(Outline of Method of Energy Regeneration Performed in First Embodiment)

In the present embodiment, in order to enable energy regeneration using the electric supercharger 24 to be performed while controlling oil leakage from the oil seal portion 22e of the turbocharger 22, regeneration of energy is performed by the following method.

Here, a limit pressure P2L is used as the limit (the lowest) intake pressure P2 for prevention of oil leakage from the oil seal portion 22e. The limit pressure P2L is the minimum value of the intake pressure P2 that satisfies conditions which do not cause oil leakage from the oil seal portion 22e to the turbo compressor 22a side. Oil leakage occurs as a result that the intake pressure Ps becomes lower than the turbo internal pressure P0. Accordingly, it can be said that when the intake pressure P2 is equal to or higher than the limit pressure P2L, the condition that the intake pressure Ps is equal to or higher than the turbo internal pressure P0 is satisfied.

In the present embodiment, in the case of performing energy regeneration, the power generation load on the MG 24b and the opening degree of the intake bypass valve 36 are controlled so that the intake pressure P2 does not fall below the limit pressure P2L, on the basis of the request intake air flow rate GaR and the limit pressure P2L of the internal combustion engine 10.

More specifically, the operation of the energy regeneration which is performed in a mode of controlling the power generation load of the MG 24b to be the maximum value within a predetermined control range while fully closing the intake bypass valve 36 is referred to as a "maximum regenerative operation" here. If the condition that the intake pressure P2 becomes the limit pressure P2L or more is satisfied when the maximum regenerative operation is performed under the present request intake air flow rate GaR (corresponding to a case applicable to a range A in FIG. 8 described later), the maximum regenerative operation is executed when a request to perform energy regeneration (hereinafter, referred to as a "regeneration execution request") is made. In response to this, the throttle valve 40 is opened so that the intake manifold pressure Pb is close to the request intake manifold pressure PbR corresponding to the request intake air flow rate GaR.

If, on the other hand, the condition that the intake pressure P2 becomes the limit pressure P2L or more is not satisfied when the maximum regenerative operation is performed under the present request intake air flow rate GaR, the intake bypass valve 36 is opened to satisfy the above described condition when the regeneration execution request is made, provided that the above described condition is satisfied by opening the intake bypass valve 36 (corresponding to a case applicable to a range B described later). Meanwhile, when the above described condition is not satisfied even if the opening degree of the intake bypass valve 36 is set at the full opening degree (the opening degree of 100%) (corresponding to a case applicable to a range C described later), the power generation load is reduced within the above described control range to satisfy the above described condition while the intake bypass valve 36 is fully opened. In all of these cases, the throttle valve 40 is opened so that the intake manifold pressure Pb is close to the request intake manifold pressure PbR corresponding to the request intake air flow rate GaR, in response to control of the opening degree of the intake bypass valve 36 or the power generation load.

Here, in the present embodiment, a maximum value within the above described control range of the power generation load on the MG 24b is a value regarded as follows. That is, the maximum value mentioned here corresponds to a power generation load that can apply a regenerative braking force required to cancel an amount of increase of the rotational speed Nec of the electric compressor 24a which is assumed when the opening degree of the throttle valve 40 is set at the full opening degree while the opening degree of the intake bypass valve 36 is set at the fully closed opening degree (opening degree of 0%) under the present request intake air flow rate GaR (more specifically, under the flow rate GaR immediately before start of regeneration) in order to perform regeneration. Meanwhile, the minimum value of the power generation load within the above described control range is set at zero in the present embodiment. Accordingly, when the minimum value is used, no power generation load is applied to the MG 24b.

In the present embodiment, as an index value indicating the magnitude of the power generation load, a regeneration duty ratio (%) is used. Using 100% as the regeneration duty ratio corresponds to applying the power generation load of the above described maximum value to the MG 24b. Using 0% as the regeneration duty ratio corresponds to using the above described minimum value, that is, performing no regeneration. In this way, changing the regeneration duty ratio between 0% and 100% corresponds to changing the magnitude of the power generation load within the above described control range, and in other words, corresponds to changing the level of the braking force of rotation of the electric compressor 24a by regeneration between zero level to the maximum level.

(Specific Processing in First Embodiment)

Figure 3:
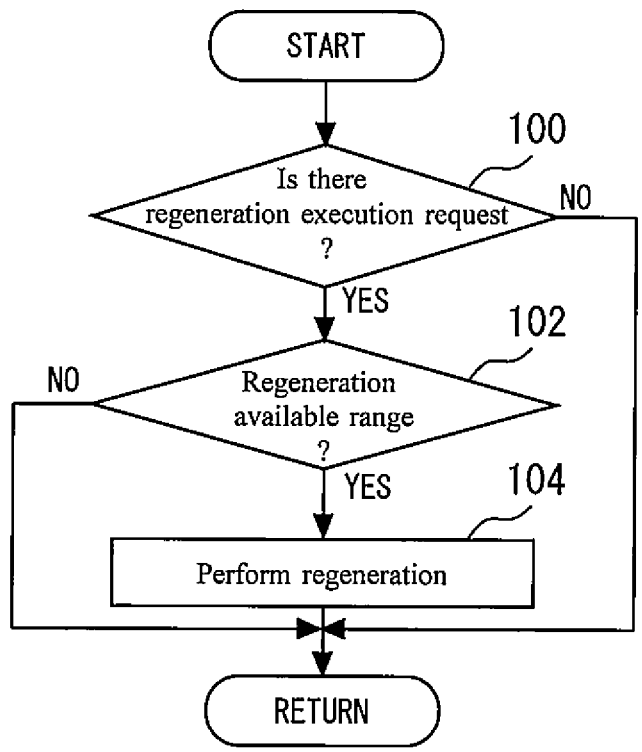
FIG. 3 is a flow chart showing a routine according to the first embodiment of the present application that is executed to determine presence or absence of implementation of energy regeneration using an electric supercharger.

FIG. 3 is a flow chart showing a routine executed by the ECU 50 to determine presence or absence of implementation of energy regeneration using the electric supercharger 24. In the routine shown in FIG. 3, the ECU 50 firstly determines whether or not a regeneration execution request is present (step 100). Whether or not the regeneration execution request is present is determined on the basis of whether or not the state of charge (SOC) of the battery 28 detected by the SOC sensor 32 is at a predetermined value or less.

Figure 4:
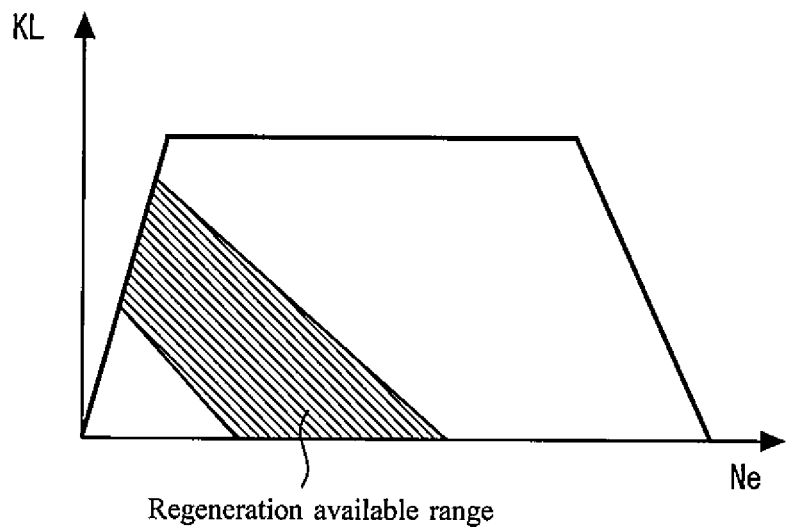
FIG. 4 is a diagram showing an example of a regeneration available range.

When it is determined in step 100 that the regeneration execution request is present, the ECU 50 determines whether or not the present operation range of the internal combustion engine 10 is a regeneration available range (step 102). FIG. 4 is a diagram showing an example of the regeneration available range. In FIG. 4, the engine operation range is expressed by a relation of an engine load rate (an in-cylinder air charging rate) KL and the engine speed Ne. In order to start energy regeneration of the present embodiment, it is necessary that the present engine operation range is an operation range where the intake air flow rate Ga is controlled by regulation of the opening degree of the throttle valve 40, namely, an operation range in which the throttle valve 40 can be opened for starting energy regeneration. In an operation range where the engine load rate KL and the engine speed Ne are low, regeneration efficiency is low since the intake air flow rate Ga is small. Accordingly, the regeneration available range used as an example in the present embodiment is set as shown in FIG. 4 with these requirements and the like taken into consideration.

When it is determined in step 102 that the present engine operation range is the regeneration available range, the ECU 50 performs regeneration using the electric supercharger 24 (step 104). Specifically, the ECU 50 executes processing of a routine shown in FIG. 5 described as follows. When, on the other hand, it is determined that the regeneration execution request is absent in step 100, or when it is determined in step 102 that the present engine operation range is not the regeneration available range, the ECU 50 does not perform regeneration.

Figure 5:
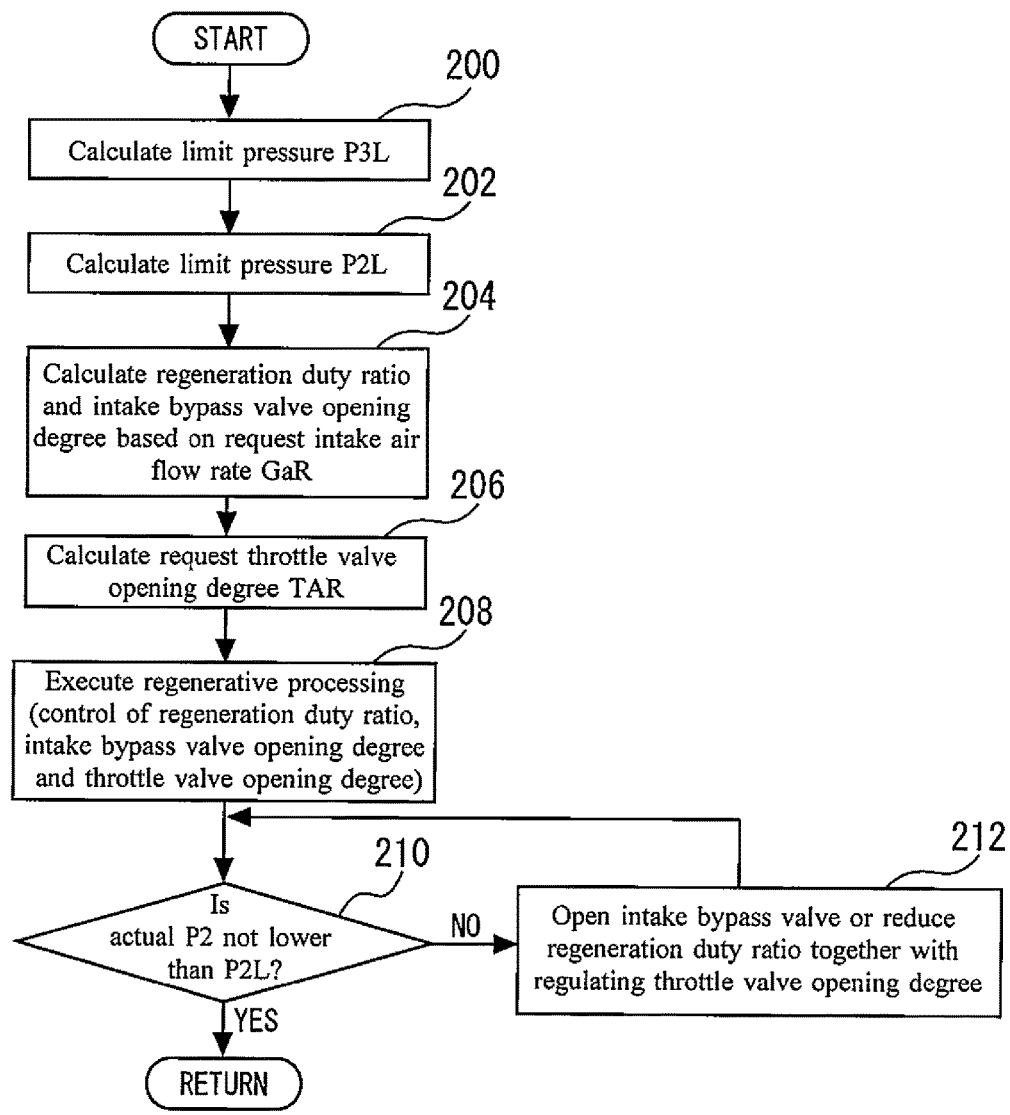
FIG. 5 is a flowchart of a routine according to the first embodiment of the present application that is executed to perform regeneration.

FIG. 5 is a flowchart of a routine executed by the ECU 50 to perform regeneration, in the first embodiment. In the routine shown in FIG. 5, the ECU 50 firstly calculates a limit pressure P3L (step 200). The limit pressure P3L is the limit (the lowest) intake pressure P3 (the outlet pressure of the turbo compressor 22*a*) for prevention of oil leakage from the oil seal portion 22*e*. Accordingly, it can be said that if the intake pressure P3 is the limit pressure P3L or more, the condition that the intake pressure Ps is the turbo internal pressure P0 or more is satisfied.

The limit pressure P3L can be calculated as follows on the basis of the limit pressure PsL and the turbo rotational speed Nt. The limit pressure PsL is a value regarded as the minimum value of the intake pressure Ps which satisfies the condition that the intake pressure Ps (the intake pressure in the vicinity of the connection shaft 22*c*) is the turbo internal pressure P0 or more, and is set as a value obtained by adding a predetermined margin α to the turbo internal pressure (≈atmospheric pressure) P0. Here, the turbo internal pressure P0 is a constant that is obtained in advance. As a result, the limit pressure PsL is also a constant.

Figure 6:
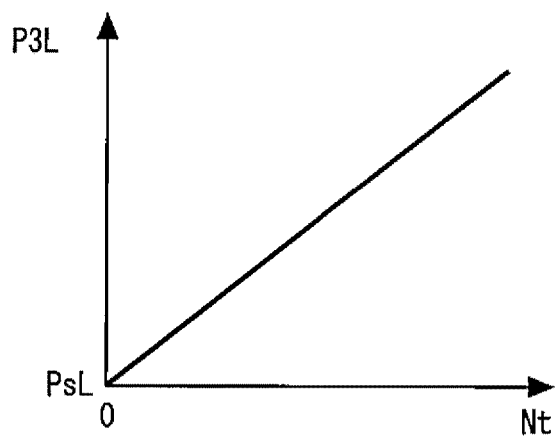
FIG. 6 is a diagram showing a relation between the limit pressure P3L and the turbo rotational speed Nt.

FIG. 6 is a diagram showing a relation between the limit pressure P3L and the turbo rotational speed Nt. The density of air in the site which is in the vicinity of the rear surface of the turbo compressor 22*a* and in the vicinity of the connection shaft 22*c* becomes low due to the fact that as the turbo rotational speed Nt is higher, the centrifugal force becomes larger. Consequently, when the turbo compressor 22*a* rotates, the intake pressure Ps at the above described site becomes lower than the intake pressure P3 at a site that is located on the outer side in the radial direction of the turbo compressor 22*a* relative to the above described site corresponding to the intake pressure Ps. A difference of the intake pressure P3 from the intake pressure Ps becomes larger as the turbo rotational speed Nt becomes higher. Accordingly, as shown in FIG. 6, the limit pressure P3L becomes higher as the turbo rotational speed Nt is higher. When the turbo rotational speed Nt is zero, a difference does not occur between the intake pressure P3 and the intake pressure Ps. Consequently, the limit pressure P3L at this time becomes equal to the limit pressure PsL.

Thus, in the ECU 50, a map is stored, in which the relation between the turbo rotational speed Nt and the limit pressure P3L is set with a characteristic (see FIG. 6) that as the turbo rotational speed Nt is higher, the limit pressure P3L becomes higher. According to the map, the limit pressure P3L at the time of the turbo rotational speed Nt being zero is set as the limit pressure PsL. In step 200, the limit pressure P3L is calculated on the basis of the present turbo rotational speed Nt which is detected by the turbo rotational speed sensor 22*d* with reference to the map. The turbo rotational speed Nt may be acquired by using an estimation method based on parameters (for example, the intake air flow rate Ga and the WGV opening degree) relating to the turbo rotational speed Nt, for example, without being limited to the method using the turbo rotational speed sensor 22*d*.

Figure 7:
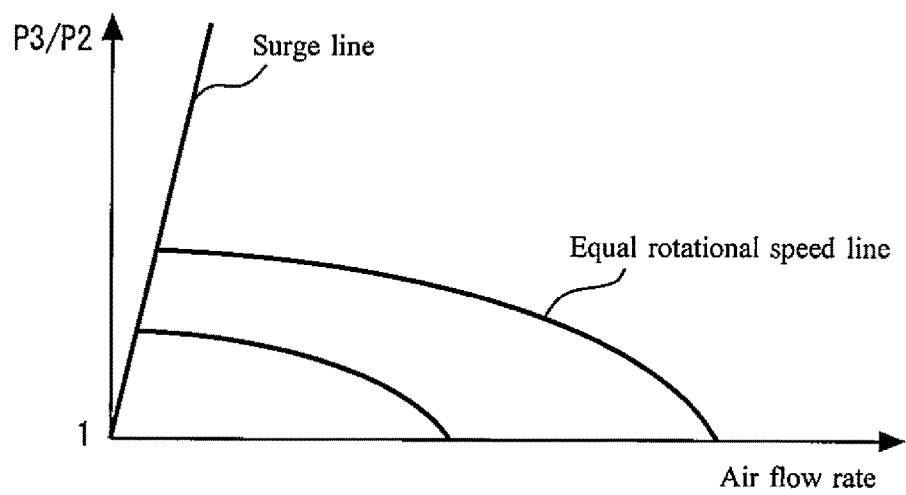
FIG. 7 is a compressor map that expresses a relation between the pressure ratio (P3/P2) of the turbo compressor, and the flow rate of air passing through the turbo compressor.

Next, the ECU 50 calculates the limit pressure P2L which satisfies the condition under which oil leakage does not occur (step 202). FIG. 7 is a compressor map that expresses a relation between the pressure ratio (P3/P2) of the turbo compressor 22*a*, and the flow rate of air passing through the turbo compressor 22*a*. According to the compressor map of the turbo compressor 22*a* as shown in FIG. 7, the intake pressure P2 can be calculated, if the intake pressure P3, the turbo rotational speed Nt and the air flow rate (=the intake air flow rate Ga) are found. Thus, in step 202, the limit pressure P2L is calculated from the limit pressure P3L calculated in step 200, the present turbo rotational speed Nt and the present intake air flow rate Ga, with the compressor map.

Figure 8:
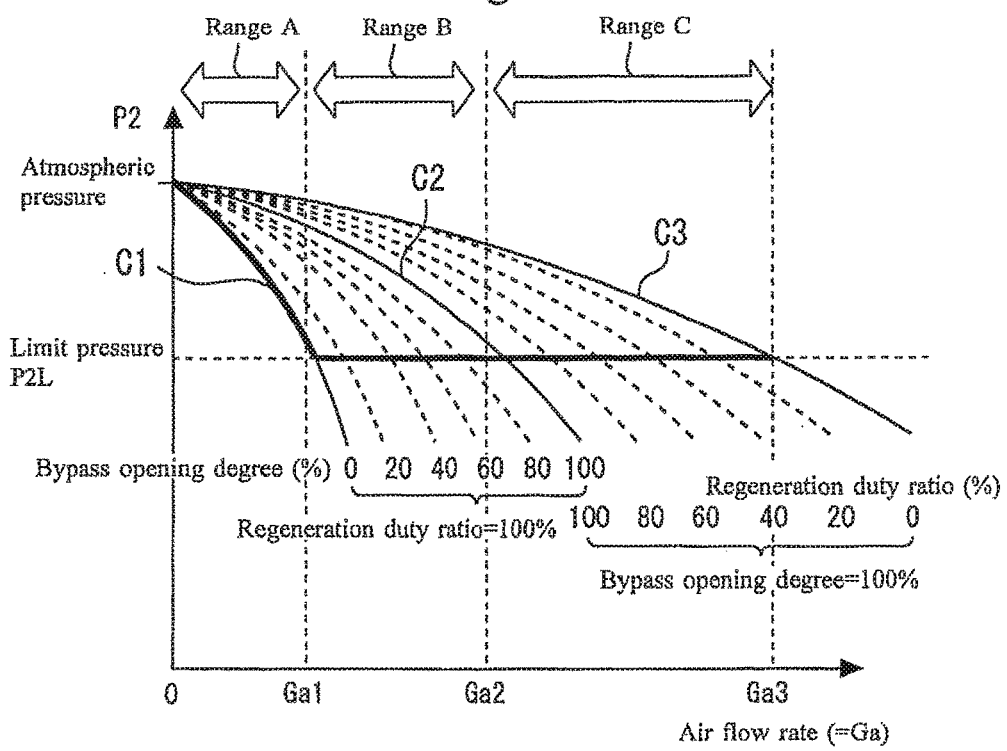
FIG. 8 shows respective relations of the regeneration duty ratio and the opening degree of an intake bypass valve with respect to the intake pressure P2 and the flow rate of air (=the intake air flow rate Ga) passing through an electric compressor.

Next, the ECU 50 calculates the regeneration duty ratio and the opening degree (a closing amount) of the intake bypass valve 36 on the basis of the request intake air flow rate GaR (step 204). The ECU 50 refers to a map having a relation shown in FIG. 8 for the calculation. FIG. 8 shows respective relations of the regeneration duty ratio and the opening degree of the intake bypass valve 36 with respect to the intake pressure P2 and the flow rate of air (=the intake air flow rate Ga) passing through the electric compressor 24*a*. The relations like them are uniquely fixed in accordance with the respective specifications of the electric compressor 24*a* and the MG 24*b*. Since the WGV opening degree in the regeneration available range is set at the full opening degree under the above described control of the WGV 48 (normal open control) of the present embodiment, the relations shown in FIG. 8 show relations at the time of the WGV opening degree being set at the full opening degree. Although in FIG. 8, for convenience of explanation, the limit pressure P2L is shown as constant irrespective of the intake air flow rate Ga, the limit pressure P2L can vary in accordance with the intake air flow rate Ga as described concerning step 202.

As shown by respective curves in FIG. 8, when settings of the regeneration duty ratio and the opening degree of the intake bypass valve 36 are the same, the intake pressure P2 becomes lower as the intake air flow rate Ga is larger. These curves shown in FIG. 8 express settings in which the opening degree of the intake bypass valve 36 is changed by 20% while the regeneration duty ratio is set at 100%, and settings in which the regeneration duty ratio is changed by 20% while the opening degree of the intake bypass valve 36 is set at the fully opening degree (opening degree of 100%). In particular, a curve C1 corresponds to a setting in which the regeneration duty ratio is 100% and the opening degree of the intake bypass valve 36 is the fully closed opening degree (opening degree of 0%). When this setting is used, the power generation load becomes the highest, and a whole amount of intake air flows to the electric compressor 24*a*. Consequently, in this setting, the degree of reduction of the intake pressure P2 with respect to an increase in the intake air flow rate Ga becomes the largest.

If the setting expressed by the curve C1 is used although the present request intake air flow rate GaR is the flow rate with which the intake pressure P2 becomes lower than the limit pressure P2L under this setting, oil leakage occurs. Consequently, when the regeneration duty ratio and the opening degree of the intake bypass valve 36 are set by referring to the relation shown in FIG. 8, if the intake pressure P2 falls below the limit pressure P2L, the regeneration duty ratio and the opening degree of the intake bypass valve 36 are restricted as follows.

The regeneration duty ratio and the opening degree of the intake bypass valve 36 are determined to be values corresponding to the request intake air flow rate GaR in accordance with the settings shown by a thick line in FIG. 8. A range A in FIG. 8 is an air flow rate range where the request intake air flow rate GaR is Ga1 or less. The air flow rate Ga1 is an air flow rate at the time of the intake pressure P2 becoming the limit pressure P2L under the setting of the curve C1 (the setting of the regeneration duty ratio of 100% and the opening degree of the intake bypass valve 36 being the fully closed opening degree). In step 204, when the request intake air flow rate GaR is a value within the range A, the intake pressure P2 does not fall below the limit pressure P2L. Therefore, the regeneration duty ratio is calculated as 100%, and the opening degree of the intake bypass valve 36 is calculated as the fully closed opening degree.

A curve C2 in FIG. 8 corresponds to a setting of the regeneration duty ratio of 100%, and the opening degree of the intake bypass valve 36 of the full opening degree (the opening degree of 100%). Further, an air flow rate Ga2 is an air flow rate at the time of the intake pressure P2 becoming the limit pressure P2L under the setting of the curve C2. A range B in FIG. 8 is an air flow rate range where the request intake air flow rate GaR is larger than Ga1 and is Ga2 or less. In step 204, when the request intake air flow rate GaR is a value within the range B, the regeneration duty ratio is calculated as 100% irrespective of the request intake air flow rate GaR, and the opening degree of the intake bypass valve 36 is calculated so as to be a larger opening degree as the request intake air flow rate GaR is larger, in order to prevent the intake pressure P2 from falling below the limit pressure P2L.

A curve C3 in FIG. 8 corresponds to a setting of the regeneration duty ratio of 0% and the opening degree of the intake bypass valve 36 of the full opening degree (the opening degree of 100%), that is, a setting in which regeneration is not performed. An air flow rate Ga3 is an air flow rate at the time of the intake pressure P2 becoming the limit pressure P2L under the setting of the curve C3. A range C in FIG. 8 is an air flow rate range where the request intake air flow rate GaR is larger than Ga2 and is Ga3 or less. In step 204, when the request intake air flow rate GaR is a value within the range C, the opening degree of the intake bypass valve 36 is calculated as the full open degree (the opening degree of 100%) irrespective of the request intake air flow rate GaR, and the regeneration duty ratio is calculated to be a lower value as the request intake air flow rate GaR is larger, in order to prevent the intake pressure P2 from falling below the limit pressure P2L. In this example, when the intake air flow rate Ga is larger than the air flow rate Ga3 which is a boundary of the range C, regeneration is not executed, in order to avoid the intake pressure P2 falling below the limit pressure P2L.

Figure 9:
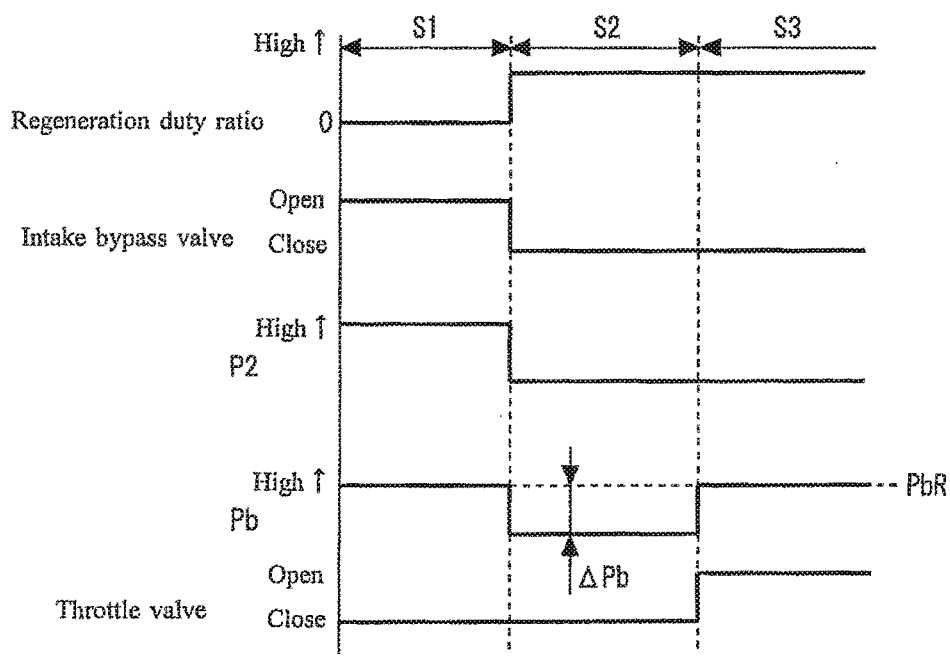
FIG. 9 is a diagram showing a relation of the regeneration duty ratio, the opening degree of the intake bypass valve, the opening degree of a throttle valve, the intake pressure P2 and the intake manifold pressure Pb.

Next, the ECU 50 calculates a request throttle opening degree TAR of the throttle valve 40 (step 206). FIG. 9 is a diagram showing a relation of the regeneration duty ratio, the opening degree of the intake bypass valve 36, the opening degree of the throttle valve 40, the intake pressure P2 and the actual intake manifold pressure Pb. Note that through operation states S1 to S3 in FIG. 9, the request intake manifold pressure PbR does not change. The operation state S1 in FIG. 9 shows a state where regeneration is not performed. The operation state S2 corresponds to an operation state that is obtained when it is assumed that the regeneration duty ratio is increased to a certain value from zero for the purpose of regeneration, and the intake bypass valve 36 is closed, when the engine operation state is in the operation state S1. Since in the operation state S2, the electric compressor 24a becomes a restrictor, the intake pressure P2 is reduced as compared with that in the operation state S1, and with this, the actual intake manifold pressure Pb is also reduced by a difference ΔPb. The operation state S3 corresponds to an operation state that is obtained when it is assumed that the throttle valve 40 is opened with an opening degree that can cancel the difference ΔPb, when the engine operation state is in the operation state S2.

Calculation of the request throttle opening degree TAR in the processing of step 206 corresponds to calculation of the opening degree of the throttle valve 40 which is required to cancel out the difference ΔPb (see FIG. 9) which is assumed when regeneration is assumed to be performed with the regeneration duty ratio and the opening degree of the intake bypass valve 36 which are calculated in step 204. The ECU 50 stores a map (not illustrated) in which the request throttle opening degree TAR is set in advance on the basis of the request intake manifold pressure PbR, the regeneration duty ratio and the opening degree of the intake bypass valve 36. In step 206, the request throttle opening degree TAR is calculated with reference to such a map.

Next, the ECU 50 executes regenerative processing (step 208). Specifically, the regenerative processing mentioned here includes not only controlling the inverter 26 so as to be able to obtain the regeneration duty ratio calculated in step 204 but also the following processing relating to regeneration. That is, the regenerative processing mentioned here includes controlling the intake bypass valve 36 so that the intake bypass valve 36 has the opening degree calculated in step 204, and controlling the throttle valve 40 so that the throttle valve 40 has the request throttle opening degree TAR calculated in step 206.

Next, the ECU 50 determines whether or not the actual intake pressure P2 detected by the intake pressure sensor 42 is the limit pressure P2L or more (step 210). When the present determination is established as a result, the ECU 50 ends the present processing cycle. A method for acquiring the actual intake pressure P2 is not limited to detection by the intake pressure sensor 42, but may, for example, be a method using estimation based on various parameters that relate to the actual intake pressure P2, such as the intake air flow rate Ga, the regeneration duty ratio and the opening degree of the intake bypass valve 36.

Meanwhile, when the actual intake pressure P2 is less than the limit pressure P2L, the ECU 50 executes regulation of the opening degree of the intake bypass valve 36 or regulation of the regeneration duty ratio for satisfying the condition in which the actual intake pressure P2 becomes the limit pressure P2L or more (step 212). Specifically, when the opening degree of the intake bypass valve 36 is not currently the full opening degree, the opening degree of the intake bypass valve 36 is opened by a predetermined amount. When, on the other hand, the opening degree of the intake bypass valve 36 is currently the full opening degree, the regeneration duty ratio is reduced by a predetermined amount. In step 212, the opening degree of the throttle valve 40 is regulated so that a change in the intake air flow rate Ga does not occur, in response to regulation of the opening degree of the intake bypass valve 36 or the regeneration duty ratio. The processing in step 212 is repeatedly executed until the determination in step 210 is established.

According to the routines shown in FIGS. 3 and 5 described above, in the case of performing energy regeneration using the electric supercharger 24, the regeneration duty ratio and the opening degree of the intake bypass valve 36 are controlled so that the intake pressure P2 does not fall below the limit pressure P2L. Accordingly, the intake pressure Ps which is the pressure in the vicinity of the connection shaft 22c of the turbocharger 22 can be prevented from being reduced to be less than the turbo internal pressure P0. Consequently, when energy regeneration using the electric supercharger 24 that is equipped with the electric compressor 24a upstream of the turbo compressor 22a is performed, oil leakage to the turbo compressor 22a side from the oil seal portion 22e can be controlled.

More specifically, as shown in FIG. 8, when the request intake air flow rate GaR is larger than the air flow rate Ga1 at the time of the intake pressure P2 becoming the limit pressure P2L in the state where the regeneration duty ratio is set at 100% and the intake bypass valve 36 is fully closed (that is, in the case of using the range B or the range C), the opening degree of the intake bypass valve 36 is made larger, or the opening degree of the intake bypass valve 36 is made larger and the regeneration duty ratio is made smaller (that is, the power generation load is made lower), as compared with when the request intake air flow rate GaR is smaller than the air flow rate Ga1 (that is, in the case of using the range A). Accordingly, when regeneration is performed under the situation where the request intake air flow rate GaR is large, the intake pressure P2 can be prevented from falling below the limit pressure P2L.

In particular, when the request intake air flow rate GaR is larger than the air flow rate Ga1 (that is, in the case of using the range B), the opening degree of the intake bypass valve 36 is made larger, as the request intake air flow rate GaR is larger. Accordingly, even if the request intake air flow rate GaR increases, the flow rate of the intake air flowing to the electric compressor 24a can be restrained from increasing. In this way, according to the control of the opening degree of the intake bypass valve 36 like this, the opening degree of the intake bypass valve 36 can be properly set so that the intake pressure P2 does not fall below the limit pressure P2L.

When the request intake air flow rate GaR is larger than the air flow rate Ga2 at the time of the intake pressure P2 becoming the limit pressure P2L in the state where the regeneration duty ratio is set at 100% and the intake bypass valve 36 is fully opened (that is, in the case of using the range C), the regeneration duty ratio is made lower as the request intake air flow rate GaR is larger (that is, the power generation load is made lower). Accordingly, even if the request intake air flow rate GaR increases, the pressure loss of the intake air in the electric compressor 24a can be restrained from increasing. In this way, according to the control of the regeneration duty ratio like this, the regeneration duty ratio can be properly set so that the intake pressure P2 does not fall below the limit pressure P2L.

According to the routine shown in FIG. 5, when the actual intake pressure P2 falls below the limit pressure P2L in the case of performing regeneration by using the regeneration duty ratio and the opening degree of the intake bypass valve 36 which are determined on the basis of the request intake air flow rate GaR while the limit pressure P2L is taken into consideration, feedback control is also executed to correct the opening degree of the intake bypass valve 36 or the regeneration duty ratio so that the actual intake pressure P2 becomes the limit pressure P2L or more. It may be difficult to perform regeneration while the actual intake pressure P2 is reliably prevented from falling below the limit pressure P2L, by only controlling the regeneration duty ratio and the opening degree of the intake bypass valve 36 in accordance with the relation that is set in advance, due to factors such as an individual difference and a change over time of the internal combustion engine. Consequently, performing feedback control as described above itself is not essential, but by executing the feedback control in an auxiliary manner, it becomes possible to reliably prevent the actual intake pressure P2 from falling below the limit pressure P2L during execution of regeneration.

In the aforementioned first embodiment, the throttle valve 40 corresponds to an "intake air flow rate regulation device" according to the present application, and the ECU 50 which executes the processing according to the flow charts shown in FIGS. 3 and 5 corresponds to a "regenerative processing section" according to the present application. The intake pressure P3 corresponds to a "first intake pressure" according to the present application, and the intake pressure P2 corresponds to a "second intake pressure" according to the present application. The intake pressure sensor 42 corresponds to a "second intake pressure acquiring device" according to the present application, and the limit pressure P3L corresponds to a "first specific pressure value" according to the present application. The limit pressure P2L corresponds to a "second specific pressure value" according to the present application, the air flow rate Ga1 corresponds to a "first intake air flow rate" according to the present application, and the air flow rate Ga2 corresponds to a "second intake air flow rate" according to the present application, respectively.

Second Embodiment

Next, a second embodiment of the present application will be described by newly referring to FIG. 10. In the following explanation, as an example of a system configuration of the second embodiment, the system configuration already described with reference to FIG. 1 is used.

[Control of Second Embodiment]
(Outline of Method of Energy Regeneration Performed in Second Embodiment)

In the present embodiment, when a regeneration execution request is present, regenerative processing is changed on the basis of whether or not a regeneration enhancement request to enhance the regeneration is present. Specifically, the regenerative processing when the regeneration execution request is made without the regeneration enhancement request is the same as the regenerative processing according to the processing of the routine shown in FIG. 5 in the first embodiment. Meanwhile, when the regeneration execution request is made with the regeneration enhancement request, regenerative processing is executed as follows.

The amount of exhaust energy collected by the turbine 22b can be increased by closing the WGV 48. When the amount of the exhaust energy collected by the turbine 22b increases, the drive force of the turbo compressor 22a by the turbine 22b increases, and therefore supercharging by the turbo compressor 22a is performed more positively. This leads to an increase in the intake air flow rate Ga. Accordingly, at the time of regeneration, regenerative electric power can be increased by closing the WGV 48, and increasing, by the amount necessary to cancel the increase in the intake air flow rate Ga following the closing of the WGV 48, the power generation load to be applied to the MG 24b.

Thus, in the present embodiment, when the regeneration execution request is made with the regeneration enhancement request, the WGV 48 is closed by the predetermined amount, and the power generation load which is applied to the MG 24b is increased so that an increase in the intake air flow rate Ga does not occur due to the closing of the WGV 48 by the predetermined amount. When regeneration enhancement is performed by the control like this, the maximum value in the control range of the power generation load for regeneration (in other words, the power generation load at the time of the regeneration duty ratio being 100%) becomes larger as compared with the value in the case without regeneration enhancement.

(Specific Processing in Second Embodiment)

In the present embodiment, the process of the routine shown in FIG. 3 described above is used, with respect to determination of presence or absence of implementation of energy regeneration using the electric supercharger 24. FIG. 10 is a flowchart showing a routine executed by the ECU 50 to perform regeneration in the second embodiment.

Figure 10:
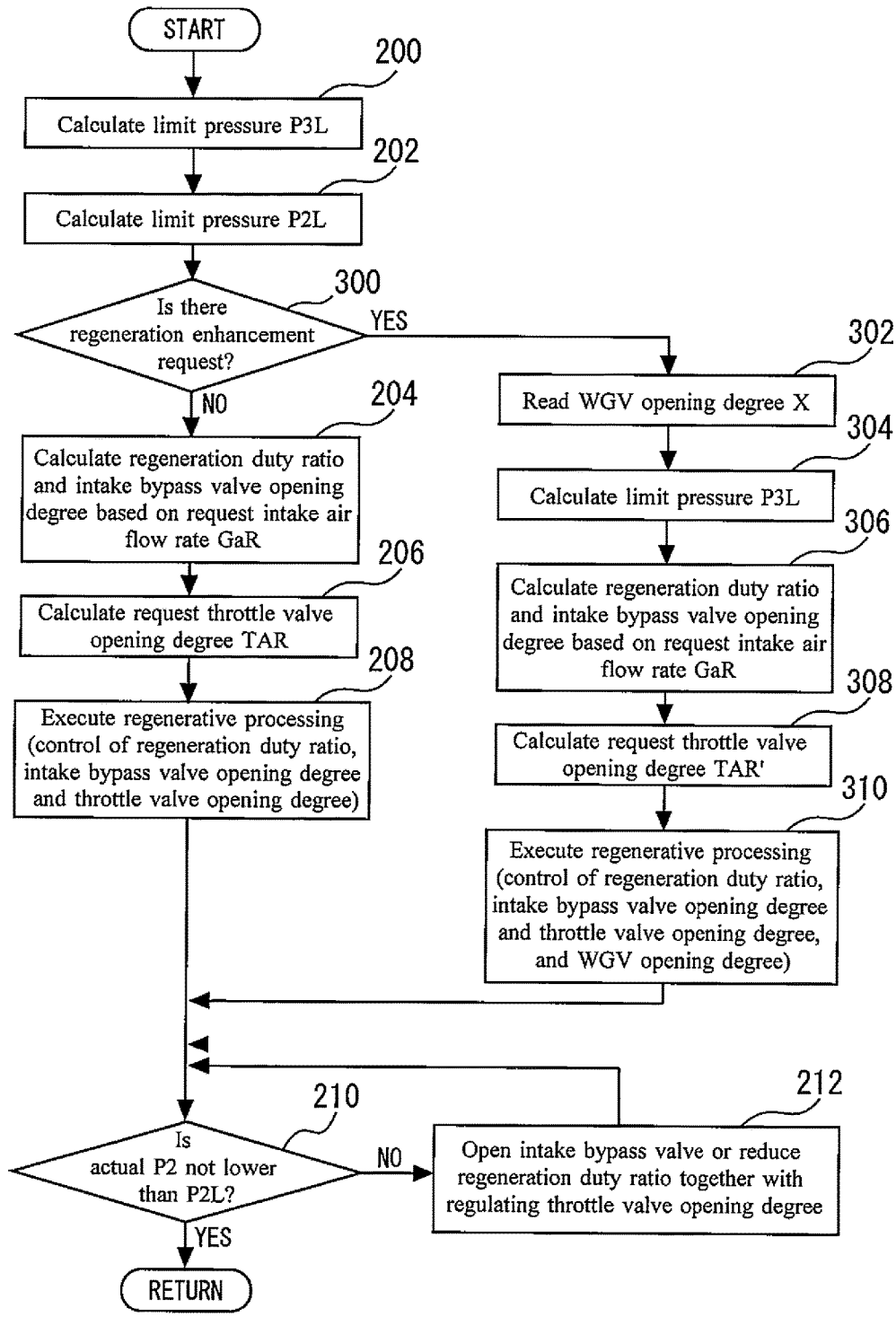
FIG. 10 is a flowchart showing a routine according to a second embodiment of the present application that is executed to perform regeneration.

In the routine shown in FIG. 10, after calculating the limit pressure P3L in step 200, the ECU 50 determines whether or not the regeneration execution request at this time is accompanied by the regeneration enhancement request (step 300). Whether or not the regeneration enhancement request is present is determined on the basis of whether or not the state of charge (SOC) of the battery 28 is a second determination value that is smaller than or equal to the determination value used in the determination in step 100, as an example. The regeneration enhancement request like this corresponds to a request to enhance electric power that is collected by regeneration.

When it is determined in step 300 that the regeneration enhancement request is absent, the ECU 50 proceeds to step 202. That is, in this case, the same processing as in the regeneration in the first embodiment is executed. Meanwhile, when it is determined in step 300 that the regeneration enhancement request is present in step 300, the ECU 50 reads a WGV opening degree X for regeneration enhancement from the memory (step 302). If the aforementioned normal open control is used, the WGV 48 is set at the full opening degree, in the regeneration available range in which the throttle valve 40 can be opened for the purpose of regeneration. The WGV opening degree X which is used in the present routine is set in advance as an opening degree (an opening degree at a closing side) smaller by a predetermined amount than the full opening degree for the purpose of regeneration enhancement. The WGV opening degree X is not limited to a value that is set as a fixed value, but may be changed in accordance with the extent of the regeneration enhancement request (for example, in a manner where the WGV opening degree X becomes smaller as the extent of the regeneration enhancement request is higher).

Next, the ECU 50 calculates the limit pressure P2L when the regeneration enhancement request is present (step 304). When the WGV 48 is closed for the purpose of the regeneration enhancement, the intake pressure P3 readily increases, because the amount of exhaust energy collected by the turbine 22b increases. Accordingly, the limit pressure P2L can be made lower when the WGV opening degree is small, as compared with when the WGV opening degree is large. The ECU 50 stores a map (not illustrated) in which the limit pressure P2L is set in the relation with the WGV opening degree X and the engine operation conditions (for example, the intake air flow rate and the engine speed). In step 304, the limit pressure P2L, when the WGV 48 is closed to be the WGV opening degree X that is for regeneration enhancement, is calculated with reference to the map like this. The limit pressure P2L may be estimated on the basis of the WGV opening degree X and the engine operation conditions by using a well-known engine model instead of the map. Further, the limit pressure P2L may be calculated with the following actual operation of the WGV 48. That is, in this method, the WGV 48 is closed to the WGV opening degree X, and the turbo rotational speed Nt under the WGV opening degree X is measured and is stored in the ECU 50. Thereafter, the WGV opening degree is returned quickly to the original opening degree. According to the turbo rotational speed Nt which is stored in this manner, a turbo rotational speed line on a compressor map of the turbo compressor 22a under the WGV opening degree X is found. Consequently, with the compressor map, the limit pressure P2L can be calculated based on the obtained turbo rotational speed line, the limit pressure P3L calculated in step 200, and the present intake air flow rate Ga.

Next, the ECU 50 calculates the regeneration duty ratio and the opening degree (the closing amount) of the intake bypass valve 36 on the basis of the request intake air flow rate GaR (step 306). The ECU 50 refers to a map having a relation similar to the relation shown in FIG. 8, for the calculation. More specifically, the map referred to in step 306 differs from the map having the relation shown in FIG. 8 which is set with the full opening degree as a target, in the respect that the map referred to in step 306 is set with the WGV opening degree X as a target.

Next, the ECU 50 calculates a request throttle opening degree TAR' of the throttle valve 40 (step 308). Calculation of the request throttle opening degree TAR' in the processing in step 308 corresponds to calculation of the opening degree of the throttle valve 40 which is required to cancel out a difference ΔPb that is assumed when regeneration is performed with the regeneration duty ratio and the opening degree of the intake bypass valve 36 which are calculated in step 306. In order to calculate the request throttle opening degree TAR' in the case accompanied by regeneration enhancement, the ECU 50 stores a map (not illustrated) where the request throttle opening degree TAR' is set in advance on the basis of the request intake manifold pressure PbR, the regeneration duty ratio and the opening degree of the intake bypass valve 36. In step 308, the request throttle opening degree TAR' at the time of the regeneration enforcement request being present is calculated by referring to the map like this.

Next, the ECU 50 executes regenerative processing for the time of the regeneration enhancement request being present (step 310). Specifically, the regenerative processing mentioned here includes controlling the WGV 48 so that the WGV 48 has the WGV opening degree X which is read in step 302, in addition to controlling the inverter 26 so that the regeneration duty ratio calculated in step 306 can be obtained, controlling the intake bypass valve 36 so that the intake bypass valve 36 has the opening degree calculated in step 306, and controlling the throttle valve 40 so that the throttle valve 40 has the request throttle opening degree TAR' calculated in step 308. The ECU 50 proceeds to step 210 after executing the processing in step 310.

According to the routine shown in FIG. 10 described above, when the regeneration execution request accompanied by the regeneration enhancement request is made, the regenerative processing including processing of closing the WGV 48 to the WGV opening degree X is executed. In the regenerative processing, the power generation load applied to the MG 24b is increased so that an increase in the intake air flow rate Ga does not occur due to the closing of the WGV 48 to the WGV opening degree X. Since the regeneration duty ratio and the opening degree of the intake bypass valve 36 which are calculated with the limit pressure P2L taken into consideration in accordance with the processing in step 306 are used, consideration is also given in the regenerative processing so that the intake pressure P2 does not fall below the limit pressure P2L. Consequently, it becomes possible to enhance electric power which is collected by energy regeneration while controlling oil leakage to the turbo compressor 22a side from the oil seal portion 22e.

In the aforementioned first and second embodiments, when energy regeneration is performed by using the electric supercharger 24, both the opening degree of the intake bypass valve 36 and the regeneration duty ratio (the power generation load on the MG 24b) are controlled so that the intake pressure P2 does not fall below the limit pressure P2L. However, in the regeneration in the present application, only one of the opening degree of an intake bypass valve or the power generation load on a motor generator may be controlled, as in respective examples that will be described with reference to FIGS. 11 and 12 as follows. Note that the following respective examples referring to FIGS. 11 and 12 are based on the routine shown in FIG. 5 in the first embodiment, but may be based on the routine shown in FIG. 10 in the second embodiment, instead of the routine shown in FIG. 5.

Figure 11:
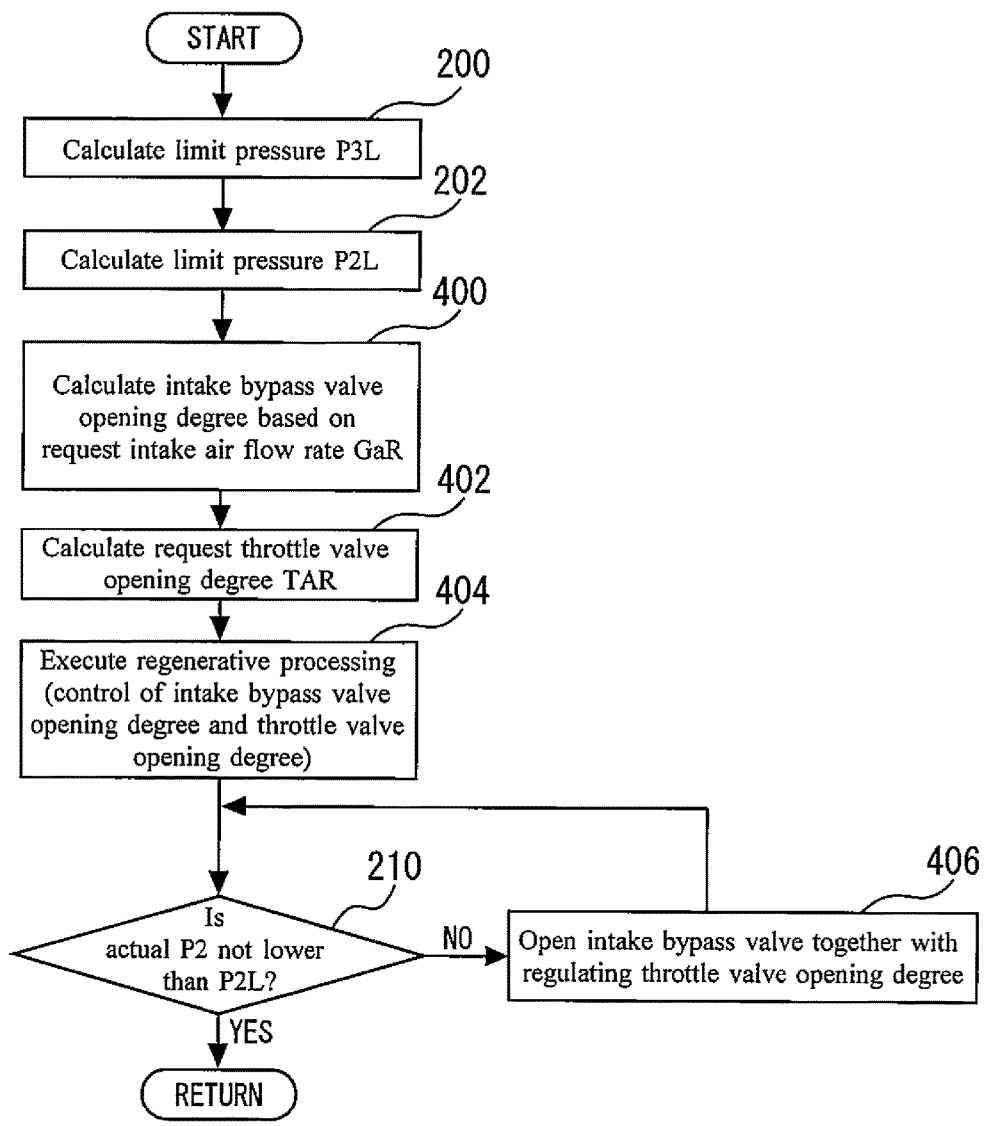
FIG. 11 is a flowchart showing a routine executed to perform regeneration, in an example where the opening degree of the intake bypass valve is used as a control target.
Figure 12:
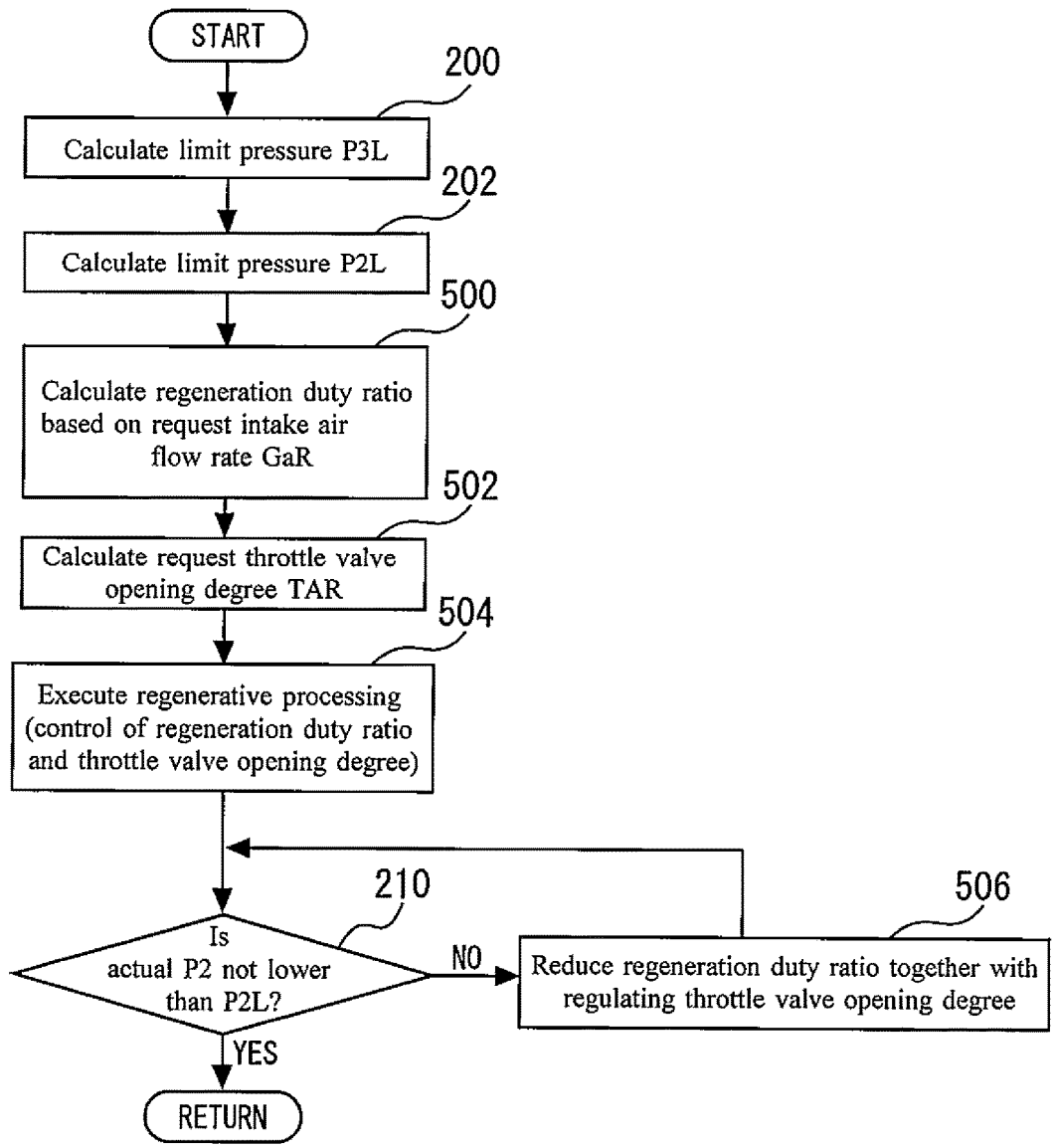
FIG. 12 is a flowchart showing a routine executed to perform regeneration in an example where the regeneration duty ratio (the power generation load) is used as a control target.

FIG. 11 is a flowchart showing a routine executed by the ECU 50 to perform regeneration, in an example where the opening degree of the intake bypass valve 36 is used as a control target. In the routine shown in FIG. 11, the ECU 50 calculates the limit pressure P2L in step 202, and thereafter calculates the opening degree (the closing amount) of the intake bypass valve 36 on the basis of the request intake air flow rate GaR (step 400). For the calculation, the ECU 50 refers to a map having a relation similar to the relation shown in FIG. 8. More specifically, a setting of the map referred to in step 400 corresponds to a setting in which the range C is deleted from the relation shown in FIG. 8. Note that in this example, when the intake air flow rate Ga is larger than the air flow rate Ga2 which is the boundary of the range B, regeneration is not executed to avoid the intake pressure P2 falling below the limit pressure P2L.

Next, the ECU 50 calculates the request throttle opening degree TAR with reference to a map (not illustrated) in which the request throttle opening degree TAR is set in advance on the basis of the request intake manifold pressure PbR and the opening degree of the intake bypass valve 36 (step 402). Next, the ECU 50 executes regenerative processing by controlling the intake bypass valve 36 so that the intake bypass valve 36 has the opening degree calculated in step 400, and controlling the throttle valve 40 so that the throttle valve 40 has the request throttle opening degree TAR calculated in step 402 (step 404).

In the routine shown in FIG. 11, when the determination in step 210 is not established, the ECU 50 increases the opening degree of the intake bypass valve 36 by a predetermined amount, and regulates the opening degree of the throttle valve 40 so that a change in the intake air flow rate Ga does not occur following the change of the opening degree of the intake bypass valve 36 (step 406).

FIG. 12 is a flowchart showing a routine executed by the ECU 50 to perform regeneration in an example where the regeneration duty ratio (the power generation load applied to the MG 24b) is used as a control target. In the routine shown in FIG. 12, the ECU 50 calculates the limit pressure P2L in step 202, and thereafter calculates the regeneration duty ratio on the basis of the request intake air flow rate GaR (step 500). The ECU 50 refers to a map having a relation similar to the relation shown in FIG. 8, for the calculation. More specifically, a setting of the map referred to in step 500 corresponds to a setting where the range B is deleted from the relation shown in FIG. 8 and the range C is included as a range continuing from the range A. Note that in this example, when the intake air flow rate Ga is larger than a boundary at the high intake air flow rate side of the range C, regeneration is not executed in order to avoid a decrease in the intake pressure P2 in such a manner as to fall below the limit pressure P2L.

Next, the ECU 50 calculates the request throttle opening degree TAR by referring to a map (not illustrated) in which the request throttle opening degree TAR is set in advance on the basis of the request intake manifold pressure PbR and the regeneration duty ratio (step 502). Next, the ECU 50 executes regenerative processing by controlling the inverter 26 so that the regeneration duty ratio calculated in step 500 is obtained, and controlling the throttle valve 40 so that the throttle valve 40 has the request throttle opening degree TAR calculated in step 402 (step 504).

Further, in the routine shown in FIG. 12, when the determination in step 210 is not established, the ECU 50 reduces the regeneration duty ratio by a predetermined amount, and regulates the opening degree of the throttle valve 40 so that a change in the intake air flow rate Ga does not occur following the change in the regeneration duty ratio (step 506).

In the aforementioned first and second embodiments, when energy regeneration is performed using the electric supercharger 24, the power generation load on the MG 24b and the opening degree of the intake bypass valve 36 are set so that the intake pressure P2 does not fall below the limit pressure P2L. Since the limit pressure P2L is calculated on the basis of the limit pressure P3L as described above, setting the power generation load on the MG 24b and the like on the basis of the limit pressure P2L in this way can be said to eventually correspond to setting the power generation load on the MG 24b and the like so that the intake pressure P3 does not fall below the limit pressure P3L. However, the control of at least one of the opening degree of the intake bypass valve and the power generation load on the motor generator at the time of execution of regeneration in the present application may be executed by setting the control target value in the relation with the intake pressure P3, in place of the above described example where the control target values of these control parameters are set in the relation with the intake pressure P2 as shown in FIG. 8. Specifically, for example, the ECU 50 is caused to store a map in which the control target value of at least one of the opening degree of the intake bypass valve 36 and the power generation load on the MG 24b is set in the relation with the request intake air flow rate GaR, the turbo rotational speed Nt and the intake pressure P3. Thereafter, at least one of the opening degree of the intake bypass valve 36 and the power generation load on the MG 24b is set on the basis of the request intake air flow rate GaR, the turbo rotational speed Nt and the intake pressure P3 by referring to the map like this, and at least one of the opening degree of the intake bypass valve 36 and the power generation load on the MG 24b may be controlled so that the intake pressure P3 does not fall below the limit pressure P3L. However, the control parameter for use in the control of the present application is at least one of the opening degree of the intake bypass valve and the power generation load on the motor generator as described above, and a change in the control amount of the control parameter directly affects the intake pressure P2. Accordingly, control of the intake pressure with higher precision can be realized when control of the control parameter is performed in association with the intake pressure P2 instead of the intake pressure P3, as in the first and second embodiments.

In the aforementioned first and second embodiments, and the aforementioned modification examples, explanation is made about the examples using the "limit pressure P3L" and the "limit pressure P2L" respectively as the "first specific pressure value" and the "second specific pressure value" which satisfy the condition under which oils leakage to the turbo compressor 22a side from the oil seal portion 22e does not occur. However, the "first specific pressure value" in the present application may, for example, be an arbitrary pressure value higher than the limit pressure P3L, without being limited to the limit pressure P3L corresponding to a lower limit value of the first intake pressure which satisfies the condition, as long as the "first specific pressure value" is a pressure value which satisfies the above described condition. The same also applies to the "second specific pressure value".

For example, a variable nozzle device that is combined into the turbocharger is also applicable to the exhaust energy regulation device that is used in the case of performing regeneration enhancement and regulates the amount of exhaust energy collected by the turbine, besides the waste gate valve. When regeneration enhancement is performed by using the variable nozzle device, a variable nozzle is closed to increase the amount of the exhaust energy collected by the turbine.

In the aforementioned first embodiment and the like, regulation of the intake air flow rate for suppressing a change in the intake air flow rate Ga (a change in engine torque) as a result of implementation of regeneration is performed by using the throttle valve 40. However, the intake air flow rate regulation device that can be used in regulation of the intake air flow rate like this includes not only the throttle valve but also a variable valve operating device that can change the valve opening characteristics of the intake valve (at least one of a working angle, a lift amount, an opening timing and a closing timing), for example.

What is claimed is:

1. An internal combustion engine for a vehicle, comprising:
    an intake passage through which intake air taken into a cylinder flows;
    an exhaust passage through which exhaust gas from the cylinder flows;
    an intake air flow rate regulation device provided in the intake passage and configured to regulate an intake air flow rate of air that is taken into the cylinder;
    a turbocharger including a turbine arranged in the exhaust passage, a turbo compressor arranged in the intake passage, a connection shaft that connects the turbine and the turbo compressor, and an oil seal portion that is provided on the connection shaft at a location on a rear surface side of an impeller of the turbo compressor;
    an electric supercharger including an electric compressor arranged in the intake passage on an upstream side of the turbo compressor, and a motor generator that is a drive source of the electric compressor and configured to function as a generator when regeneration is performed;
    an intake bypass passage connecting the intake passage on an upstream side of the electric compressor with the intake passage which is at a downstream side of the electric compressor and at an upstream side of the turbo compressor;
    an intake bypass valve configured to open and close the intake bypass passage; and
    a control apparatus including an input/output interface, memory for storing maps and programs for controlling the internal combustion engine, and a processor for executing the programs stored in the memory or obtaining data from the maps for generating operating signals based on data received by the input/output interface from a plurality of sensors located on the internal combustion engine or the vehicle, and using the operating signals to control a plurality of actuators located on the internal combustion engine, the control apparatus configured to:
    control an intake air flow rate, an opening degree of the intake bypass valve and a power generation load on the motor generator in order to execute regenerative processing with the electric supercharger, and
    at a time of execution of the regenerative processing, set at least one of the opening degree of the intake bypass valve and the power generation load on the motor generator, based on a request intake air flow rate of the internal combustion engine, a rotational speed of the turbocharger, and a first specific pressure value which is a pressure value of a first intake pressure that is an intake pressure measured by a sensor of the plurality of sensors at an outlet of the turbo compressor and which satisfies a condition where oil leakage to a side of the turbo compressor from the oil seal portion does not occur.

2. The internal combustion engine according to claim 1, the control apparatus is further configured to:
    acquire a second intake pressure that is an intake pressure downstream of the electric compressor and upstream of the turbo compressor;
    calculate a second specific pressure value which is a pressure value of the second intake pressure and which satisfies a condition where the oil leakage does not occur, based on the first specific pressure value, the intake air flow rate of the internal combustion engine, and the rotational speed of the turbocharger; and
    set at least one of the opening degree of the intake bypass valve and the power generation load on the motor generator, based on the request intake air flow rate and the second intake pressure so that the second intake pressure does not fall below the calculated second specific pressure value.

3. The internal combustion engine according to claim 2, the control apparatus is further configured to, when the request intake air flow rate is larger than a first intake air flow rate at a time of the second intake pressure having the second specific pressure value wherein when the power generation load is set at a maximum value within a predetermined control range and when the intake bypass valve is fully closed, make the opening degree of the intake bypass valve larger, or make the power generation load lower, as compared with when the request intake air flow rate is smaller than the first intake air flow rate.

4. The internal combustion engine according to claim 3, the control apparatus is further configured to, when the request intake air flow rate is larger than the first intake air flow rate, make the opening degree of the intake bypass valve larger as the request intake air flow rate is larger.

5. The internal combustion engine according to claim 4, the control apparatus is further configured to, when the request intake air flow rate is larger than a second intake air flow rate at a time of the second intake pressure having the second specific pressure value in a state where the power generation load is set at the maximum value within the control range and where the intake bypass valve is fully opened, make the power generation load lower as the request intake air flow rate is larger.

* * * * *